United States Patent [19]

Brugger et al.

[11] 4,156,129

[45] * May 22, 1979

[54] ELECTRONIC REMOTE READING SYSTEM FOR A METER

[75] Inventors: Richard D. Brugger; Joseph A. Barna, both of Erie, Pa.

[73] Assignee: Zurn Industries, Inc., Erie, Pa.

[ * ] Notice: The portion of the term of this patent subsequent to Jun. 21, 1994, has been disclaimed.

[21] Appl. No.: 808,307

[22] Filed: Jun. 20, 1977

Related U.S. Application Data

[63] Continuation-in-part of Ser. No. 614,192, Sep. 17, 1975, Pat. No. 4,031,362.

[51] Int. Cl.$^2$ ............................................. G06M 3/12
[52] U.S. Cl. ........................... 235/92 FL; 235/92 MT; 235/92 R
[58] Field of Search ........ 235/92 MT, 92 FL, 92 EL, 235/92 DN, 92 MS; 340/248 R, 282; 73/194 EM, 194 E, 272 A

[56] References Cited

U.S. PATENT DOCUMENTS

| | | | |
|---|---|---|---|
| 3,154,672 | 10/1964 | Larkin | 235/92 FL |
| 3,666,928 | 5/1972 | Burke et al. | 235/92 FL |
| 3,818,192 | 6/1974 | Anderson et al. | 235/92 FL |
| 4,031,362 | 6/1977 | Brugger et al. | 235/92 FL |

*Primary Examiner*—Joseph M. Thesz
*Attorney, Agent, or Firm*—Charles L. Lovercheck

[57] ABSTRACT

A system for metering material flow made up of a member moveable in proportion to the flow of material, a permanent magnet moveable by the member and a reed switch connecting a source of energy through an electronic circuit to a counter. The circuit and reed switch are sealed in a phenolic resin, which is waterproof and enclosed in a housing that fits onto an opening in the meter housing. The circuit has a transistor with a collector connected to the counter.

20 Claims, 11 Drawing Figures

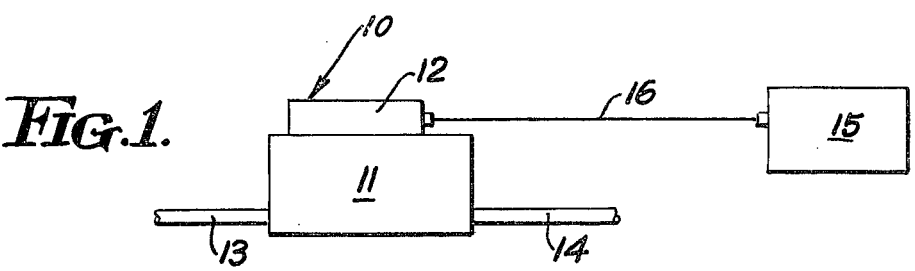
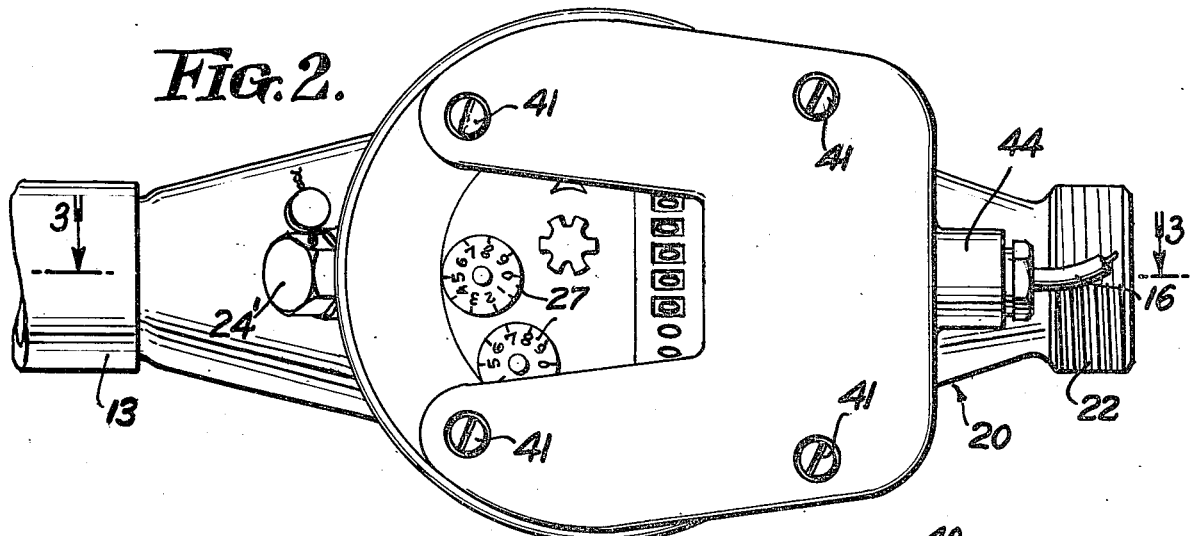
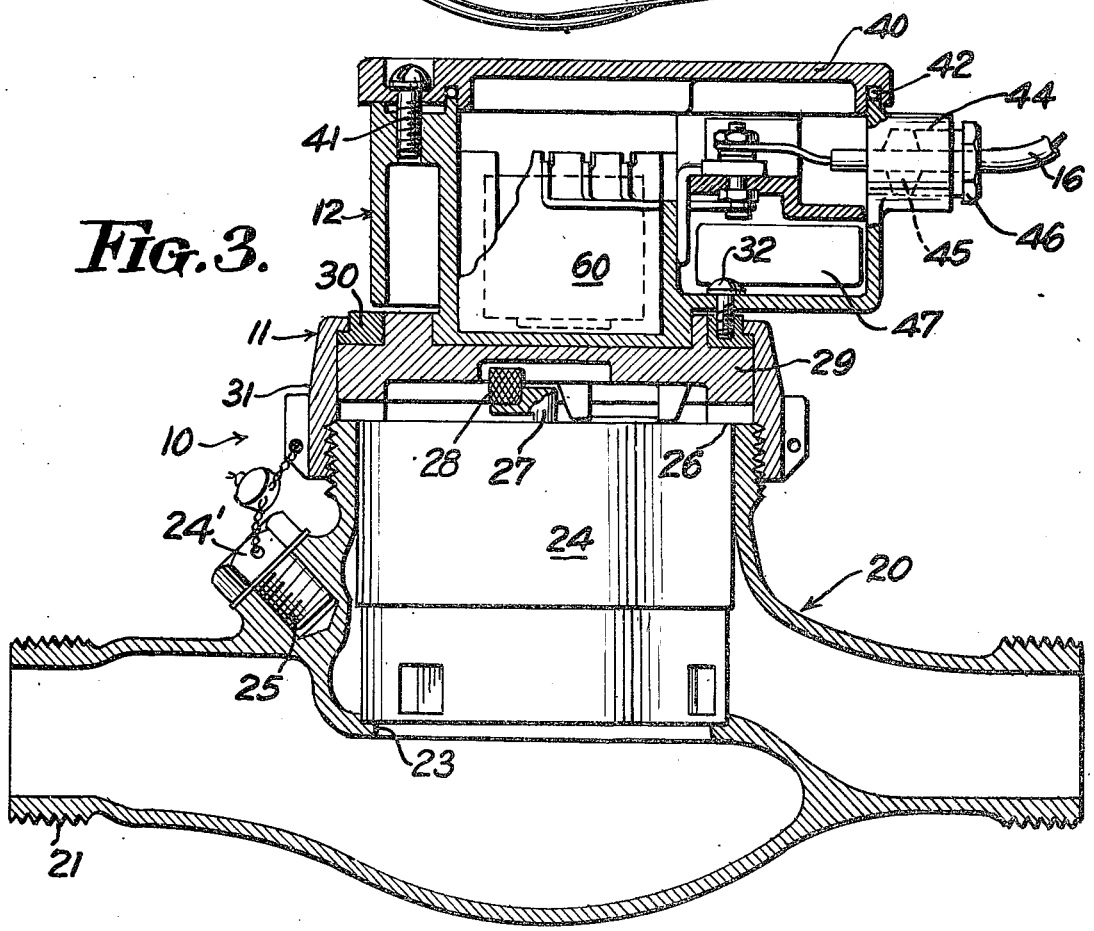

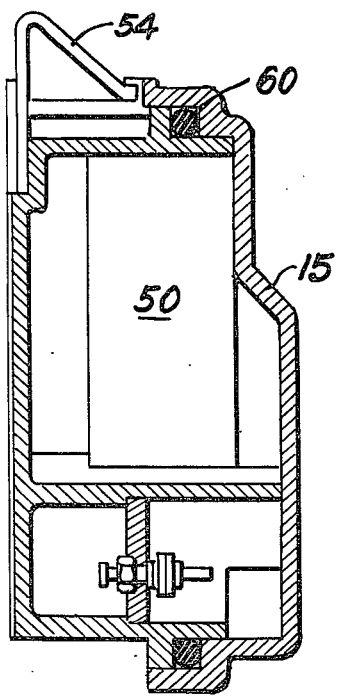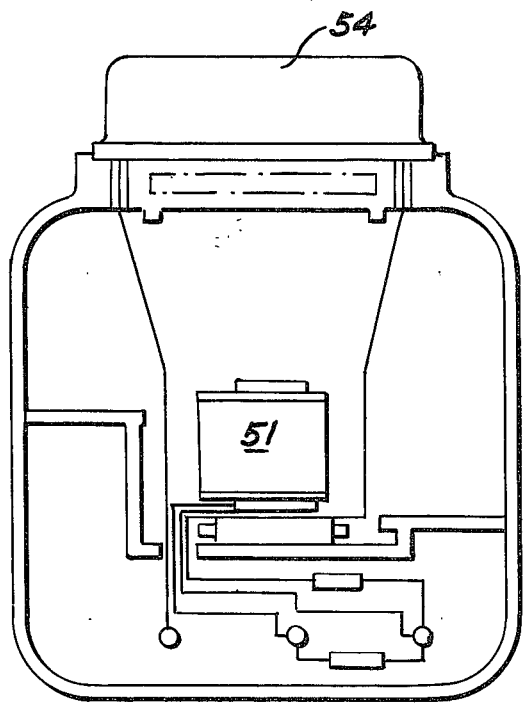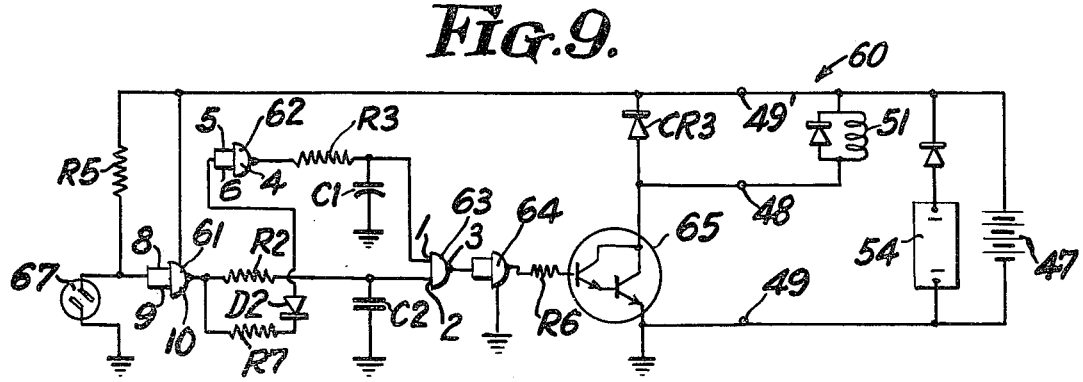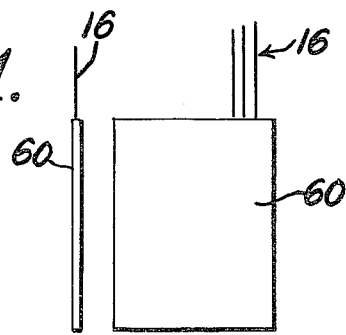

ELECTRONIC REMOTE READING SYSTEM FOR A METER

REFERENCE TO PRIOR ART

This application is a continuation-in-part of Patent Application Ser. No. 614,192, filed on Sept. 17, 1975, in the names of Richard D. Brugger and Joseph A. Barna, now U.S. Pat. No. 4,031,362.

GENERAL DESCRIPTION OF THE INVENTION

The invention is essentially made up of a readout unit that is supported on top of a conventional type water meter and a remote readout unit designed to mount on the exterior of a house in a place convenient for a person to read the tally from a digital counter unit. The remote readout unit contains the electrical mechanical counter.

A solar cell assembly for converting energy from the sun into electrical energy is attached to the housing with appropriate connections. The signal transmission cable which originates at the water meter location terminates here.

The mechanical housing is supported on the water meter and is made up of a high impact plastic which is totally sealed from the environment. A rubber ring seal is used at the rim of the main housing. An additional rubber seal of a compression type at the port where the signal transmission cable exits and extends to the remote control unit. This housing contains all of the vital components, such as electronic hybrid circuits, including the integral reed switch, power source, rechargeable Ni-Cad battery, and electrical termination. The housing mounts directly to the face of the water meter, utilizing three screws for attachment to the meter structure. Additionally, there is a protrusion at the bottom which screws into and engages a recess in the meter space for protection. Within the protrusion is the hybrid circuit with reed switch in the lower most position, such that it is acted upon by the field of a magnet located within the water meter. The purpose of this magnet is to cause the reed switch to close each time the field of the magnet sweeps across the reed switch.

The self-contained electronic circuit, power source, terminals and reed switch are within the sealed housing. This eliminates moisture problems on all components. The housing facilitates the arrangement of electric, magnetic and mechanical elements in a manner that it eliminates previous arrangements, electrical connections between meter and circuits, a source of problems under certain environments and applications in conditions. The presence of the circuit and reed switch is not visible to the observer. Consequently, it is less susceptible to tampering.

The reed switch and electronic components provide a package. The package consists of a ceramic substrate to which electronic components are affixed. The resistors are screened on and passivated. Capacitors are miniature tantalum chips.

A. HYBRID PACKAGE

1. Description. Package 14 consists of a ceramic substrate to which electronic components are affixed. The resistors R2, R3, R4, R5, R6 and R7 are screened on and passivated. Capacitors C1 and C2 are miniature tantalum chips. C/MOS gates 61, 62, 63 and 64 and Darlington transistors 65 and 66 are commercial plastic packages. A magnetically actuated reed switch 67 is also included. Deposited metalization forms the inter-connection between the renewal components.

A phenolic resin ("durez") is then applied by a dipping and baking process. It provides a hard, abrasion resistant, insulating coating which is waterproof to the extent that the hybrid circuit can be immersed in water with no noticeable effect on performance.

The circuit is basically like the circuit in the parent application, but the size is reduced so that the confined space required is reduced by 90% (to 10% of the former volume).

The number of leads extending from the circuit unit is reduced from seven (7) to three (3).

The reed switch element is now included in the hybrid package which is unique to the industry and eliminates the need for two externally running wires. The previously used wires were in a sensitive part of the electronic circuit and susceptible to electrical leakage in the presence of excessive moisture or submersion in water. The mounting screws, associated drilling, and sub-assembly operations are also eliminated.

2. Advantages of Change. Size reductions allow an innovative approach to mechanical package design.

Inclusion of reed switch within the hybrid package eliminates the connections of two wires that are in an electrical leakage sensitive region of the electronic circuit. These wires were previously susceptible to damage.

B. CIRCUIT DESIGN

1. Description. The output connections are from the collector of the Darlington transistor. Lower leakage capacitors (tantalum in place of electrolytic) and higher impedances (which are permitted by the resin-sealed circuit package) permit lower steady-state current drain from the power source.

All of the previously recited advantages over the prior art, are retained.

2. Changes. The R-C time constants were not changed; however, the change to smaller physical size capacitors dictated a lower capacity as well. Compensating for the capacitor value change, larger value resistors were used to charge and discharge these capacitors.

Output to remote counter coil is taken from transistor collector instead of emitter, thereby allowing a larger percentage of the power source voltage to appear across the coil. Or conversely, for the same voltage delivered to the coil, a lower power source voltage is required.

3. Advantages. More efficient use of the power source voltage. Slightly lower steady-state current drain from power source. Greater circuit stability and uniformity.

REFERENCE TO PRIOR ART

The remote reading system disclosed herein is of the general type shown in U.S. Pat. No. 3,666,928 issued on May 30, 1972, to William F. Burke, on a Gasoline Pump Calculator that provides a digital display and U.S. Pat. No. 3,873,814 issued to Muhammed Tianmirdadian on a Remotely Operated Net Output Ticket Printer. None of these patents, however, show the improved electronic circuit disclosed herein. The circuit and reed switch sealed in a waterproof package or the remote readout system replacing the conventional cover on a water meter.

OBJECTS OF THE INVENTION

It is an object of the invention to provide an improved remote reading system for a water meter.

Another object of the invention is to provide an improved remote reading system.

Another object of the invention is to provide a remote reading system that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a block diagram showing the meter circuit housing and remote reading unit.

FIG. 2 is a top view of a water meter with remote reading circuit housing supported thereon.

FIG. 3 is a longitudinal, cross-sectional view taken on Line 3—3 of FIG. 2.

FIG. 7 is a cross-sectional view taken on Line 7—7 of FIG. 6.

FIG. 8 is a top view of the remote readout unit with the cover removed.

FIG. 9 is a schematic view of the electronic circuit.

FIG. 10 is a side view of the circuit package.

FIG. 11 is an end view of the circuit package.

DETAILED DESCRIPTION OF THE DRAWINGS

Figure 4:
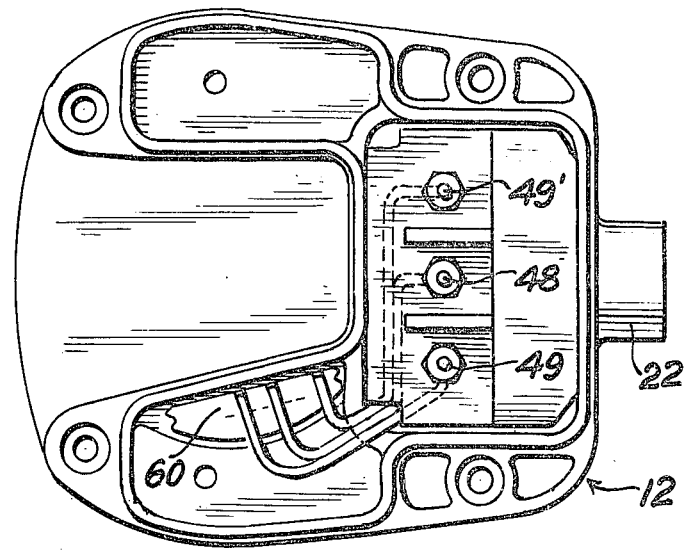
FIG. 4 is a top view of the meter and circuit housing shown in FIG. 2 with the cover removed from the circuit housing.
Figure 5:
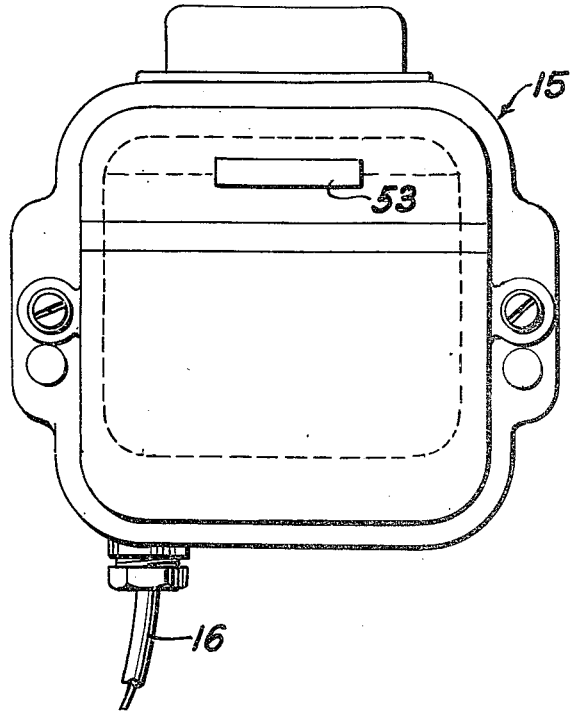
FIG. 5 is a top view of the remote readout unit.
Figure 6:
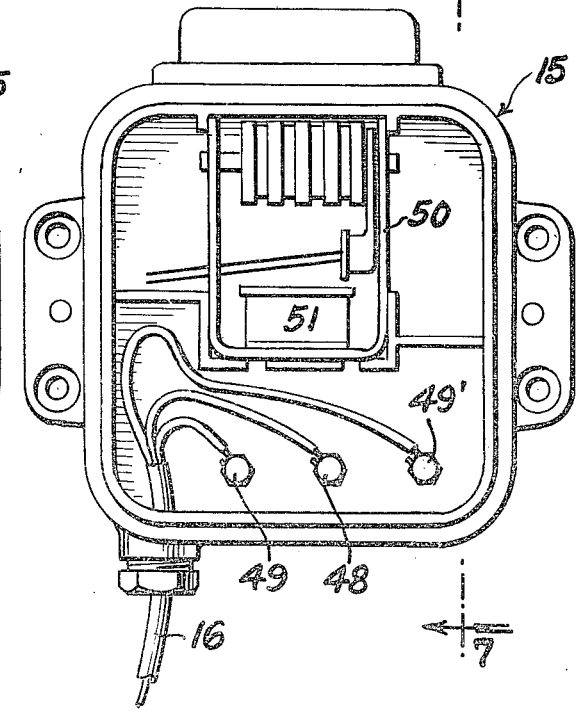
FIG. 6 is a view of the readout unit shown in FIG. 5 with the cover removed.

Now, with more particular reference to the drawings, the system according to the invention indicated generally at 10 in FIG. 1, is made up of a water meter 11 which may be connected in water lines 13 and 14; a circuit housing 12 supported on the water meter and connected to wires 16 to the remote readout unit 15.

The meter 11 shown in FIGS. 2 and 3 is of a type familiar to those skilled in the art. It has an inlet 21 and an outlet 22 which connects the interior of the meter in a waterline 13 and 14.

The meter has a partition 23 on which the register insert 24 rests. An orifice 25 admits water to the space in which the register 24 is received and the screw 24 provides an adjustment for the orifice 25 in a manner known to those skilled in the art.

The housing 20 has an open top terminating in a rim 26 and the revolving counters 27 are supported on the top of the meter. One of the counters 27 has a permanent magnet 28 fixed to it. The magnet is preferably supported on the counter having the lowest value. When the permanent magnet swings about the axis of the counter 27 providing a magnetic field which passes through the face protector 29 of the meter. A readout adapter ring 30 is held to the meter by the flanged ring 31 which threadably engages the meter and the housing assembly 12 is held fast to the adapter ring 30 by means of screws 32.

The housing 12 has a bored boss 44 through which the wires 16 exit. The boss has a resilient seal 45 through which the wires 16 pass and a grommet screw 46 compresses the seal 45. Also housed in the housing assembly 12 is the Ni-Cad cell 47 and the terminal block 48 on which the terminals 49 are supported. It will be noted that the housing 12 is generally useful so that the revolving counter 27 may be viewed between the legs of the U-shaped circuit housing 12.

The readout counter 15 will be located on the exterior of a house or at a suitable convenient place for a person to read the numerical tallies on it. The unit contains the electromagnetic counter 50 which has a collective magnetic coil 51 connected to the hybrid circuit 60 as shown in the schematic drawing. The counter 50 has the digital readout 52 which provides a display at 53. The solar cell 54 having an area of approximately one square inch is attached to the side of the housing.

THE ELECTRONIC PACKAGE

The electronic package contains the circuit shown in FIG. 9. The circuit is similar to the circuit as shown in the parent application with the exception that the resistor R6 is added to the last invention at the Darlington circuit 65 and the collectors of the two transistors in the Darlington circuit are connected to the counter coil and the emitter E is connected to the ground side.

There are three circuit states of interest for the circuit, with wave shapes as follows: (a) Reed switch closed, steady state (after the pulse has been delivered to the counter coil); (b) Reed switch open, steady state condition; (c) Pulse (Reed switch goes from open to closed state).

In state (a) the reed switch is closed. R5 is 100K ohms and it has 6 volts across it. That draws 0.06 ma. C/MOS circuit (the NAND gates) draws only 0.000001 ma. from the battery during steady state conditions. Including various leakage currents, this gives a total of about 0.065 ma.

For the state (b) the reed switch is open and total current drain (C/MOS circuit and leakage currents) is about 0.005 ma.

During the state (c) a pulse is generated to operate the counter coil. That pulse is 150 ma for 150 ms or about 22.5 ma-sec per pulse.

Total current drain on an annual basis is calculated for a "typical use" and a "worst case" condition when this system is employed on a water meter in domestic service. Meter capacity in this example is 20 gallons per minute, with the remote counter unit registering one hundred gallon counts. An industry rule of thumb for domestic usage is 100,000 gallons per year, the "typical use" condition.

Assuming that state (a) would occur approximately 12 percent of the time (reed switch held in closed position for approximately 45°/360° of shaft rotation) and state (b) would occur approximately 88 percent of the time, and that approximately 20 pulses per week ×100 gal/pulse ×52 weeks/yr. would be delivered to the coil of the remote counter unit the total current drain on an annual basis is:

Average steady state current=0.065(0.12)+0.005(0.88)=0.122 ma 8760 hours/yr.×0.0122 ma=106.9 ma-hr/yr Pulse current for 20 pulses/week (−1040 pulses/yr)=22.5 (ma-sec)/pulse×hour/(3600 sec)×1040 pulses/year=6.5 ma-hr/yr.

Total current drain is 106.9 ma-hr/yr + 6.5 ma-hr/yr or 113.4 ma-hour per year.

A "worst case" condition exists if the meter is operated continuously at rated capacity. The current drain then is calculated as steady-state current:

[0.12(0.065 ma) + 0.88(0.005 ma)] × 24 hr/day × 365 day/yr = 106.87 ma-hr/yr Pulse current for 1 pulse/100 gal. and 20 gal/min: 22.5 ma-sec/pulse × hr/3600 sec × 1 pulse/100 gal × 20 gal/min × 1440 min day × 365 day/yr − 657 ma-hr/yr. Total current drain is 106.87 ma-hr = 657 ma-hr = 763.87 ma-hr or approximately 764 ma-hr per year.

The fact that the battery has a comparatively long time between pulses to recover from the 150 ma surge is a significant fact in the longevity of the battery. A second factor in the long battery life is the low steady-state current drawn by the circuit.

The "typical use" condition described earlier indicated a power requirement of 113.5 ma-hr per year, which is 0.31 ma-hr/day and the "worst case" condition described earlier indicated a power requirement of 764 ma-hr per year, which is 2.09 ma-hr/day.

The fact that the 150 ma surge occurs at comparatively long time intervals and the fact that the steady-state current is of such a low value, make the application of a solar panel of the described physically small size practical.

FIG. 9 shows the electronic circuit. The circuit package 60 is shown in FIGS. 10 and 11. Circuit terminal 49' is connected to the positive battery terminal and circuit terminal 49 is connected to the negative battery terminal. Reed switch 67 is connected to R5 and ground. The coil of the remote counter unit 37 is connected to terminals 49 and 49'.

The logic element used in the control circuit is a NAND gate. When both inputs are at logic 1 (high) state, the output is at logic 0 (low) state. If either, or both inputs are low, then the output is high. One of these gates is shown with terminals 1 and 2 as inputs and 3 as output. The other three NAND gates have input terminals connected together and they consequently act as inverters, that is, high inputs cause a low output. Conversely, low inputs cause a high output.

Operation of the circuit is most easily described with the reed switch 67 open and no voltage across R5. Terminals 8 and 9 are high, 10 is low. Diode D2 conducts and keeps 5 and 6 low. Terminal 4 is high and charges C1 through R3. C1 charges to above logic high level. C2 is not charged (the action of D2 holds it discharged) and it is below the logic low level. Consider the NAND gate 63, where 1 is high, 2 is low, and 3 will be high. With 3 high, 11 will be low. That causes the Darlington-connected transistors 65 to be off and no voltage is applied to the counter coil 51.

The reed switch 67 is supported in the housing of the meter 20 and when the reed switch 67 goes from open to closed, terminals 8 and 9 are pulled low and that results in 10 going high. Diode D2 is back-biased and C2 is charged through R2, to above the logic high level. Thus, a logic high is on terminal 2. Recall that from the above paragraph, C1 was left with a logic high, so that at this time both 1 and 2 are high. A second effect of having C2 above logic high is that terminals 5 and 6 will be high, and 4 will be low, causing a discharge of C1 through R3. This is important because during the time interval from when C2 goes above logic high to when C1 goes down to logic low, both terminals 1 and 2 are high, causing 3 to go low. That time interval is the duration of the pulse to the counter coil, because during the time that 3 is low, 11 is high and the Darlington-connected transistor pair 65 is turned on, which puts a voltage pulse to the counter coil 51. The pulse starts when voltage across C1 is high and voltage across C2 exceeds high level and the pulse ends when voltage across C1 drops below low logic level.

The foregoing specification sets forth the invention in its preferred, practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. A remote reading system for measuring the flow of a product comprising,
    an instrument having shaft means moveable in proportion to the flow of said product, contact means,
    actuating means on said shaft means adapted to close and open said contact means in response to movement of said shaft,
    an electrical circuit connected to said contact means and connected to a counter means for counting the number of times said contact is closed,
    said electrical circuit having a power source connected thereto,
    said circuit having means comprising an electronic valve connecting said power source to said counter means,
    a control element on said electronic valve,
    and electronic pulse forming means connected to said contact means and to said control element causing said electronic valve to respond to said closing of said contact and put out a pulse of relatively short duration to said counter when said contact goes from open to closed position and put out no pulse when said contact moves from closed to open position, whereby energy flows from said power source through said electronic valve into said counter during the time of said pulse only,
    said electronic valve comprising a transister,
    said transistor having a collector and an emitter,
    said collector being connected to said counter means.

2. The circuit recited in claim 1 wherein said contact comprises a reed switch and said means on said shaft comprises a magnet rotatable in relation to said reed whereby said reed is closed upon each revolution of said shaft.

3. The circuit recited in claim 2 wherein said circuit comprises logical elements including a NAND gate.

4. The circuit recited in claim 3 wherein said circuit has four gates,
    one of said gates being connected as a NAND gate, having its output terminal connected to both inputs of another said gate, so as to create an AND function,
    the other two said gates having input terminals connected together and acting as inverters having high inputs which cause a low output and conversely having low inputs causing high outputs.

5. The circuit recited in claim 2 wherein means is provided on said circuit to prevent an output pulse under either static switch condition, when said power source is either reconnected or disconnected from said circuit.

6. The circuit recited in claim 1 wherein said circuit has means to put out a pulse, the duration of said pulse being a function of the values of the circuit components, and not dependent upon the time duration of the switch closure.

7. The system recited in claim 1 wherein said circuit has means to operate under at least 3 conditions,
the condition when the said contact means is closed and in steady state (after the pulse had been delivered to the counter coil), the condition when the contact means is open and in steady state condition, and the condition when the said contact means goes from open to closed position.

8. The system recited in claim 7 wherein said power source comprises batteries which have a life when connected in said circuit approximately equal to their shelf life.

9. The system recited in claim 7 wherein said power source comprises rechargeable batteries and a solar panel, which is fixed to the counter means and which provides an output to maintain a voltage level sufficient to provide a pulse to the counter means.

10. The system recited in claim 9 wherein said rechargeable batteries are connected to said solar panel by means of a blocking diode and wherein the flow of current from the rechargeable batteries to the solar panel is prevented by means of said blocking diode.

11. The system recited in claim 9 wherein said solar panel is of approximately one square inch area.

12. The system recited in claim 7 wherein said shaft rotates to measure the amount of product flow causing pulses of short time duration, relative to contact closure time duration,
the time interval between pulses being very long compared to the total time duration of a pulse,
whereby steady state current drain is relatively low, and relatively few increments of energy are used during a normal year of operation.

13. The system recited in claim 1 wherein said transistor comprises a Darlington connection.

14. The circuit recited in claim 1 wherein said counter means is adapted to be disposed at a location remote from said instrument.

15. The circuit recited in claim 14 wherein said counter means comprises a solar cell supported on said counter means.

16. A remote meter system comprising,
a meter body,
a register housing supported on said meter body,
a rotatable meter means in said meter body rotatable in proportion to the quantity of material flowing through said housing,
magnet means supported on said rotatable means,
a hybrid circuit,
said hybrid current comprising,
a plurality of electrical components including a control element, an electronic valve, a counter, and a power source to generate a pulse and a reed switch having contact means sealed in a phenolic resin body,
said electrical components and said reed switch comprising a package,
said reed switch being disposed adjacent said magnet and being adapted to open and close each time said magnet passes said package being disposed in said register housing,
said electrical components comprising an electronic pulse forming means connected to said contact means and to said control element causing said electronic valve to respond to said closing of said contact and put out a pulse to said counter of relatively short duration when said contact goes from open to closed position and put out no pulse when said contact moves from closed to open position, whereby energy flows from said power source through said electronic valve into said counter during the time of said pulse only.

17. The remote reading system recited in claim 16 wherein said reed switch is connected to a remote meter system by means of said circuit.

18. The remote reading system recited in claim 17 wherein said electrical components comprise,
a package incuding a ceramic substrate to which resistors are screened and passivated, tantalum clip capacitors are secured to said ceramic substrate and deposited metalization connects said resistor and capacitors to said reed switch.

19. The remote reading system recited in claim 18 wherein said electronic circuit is heated inside said phenolic resin.

20. The combination recited in claim 16 wherein said housing is sealed with said package therein.

* * * * *